United States Patent [19]
James

[11] Patent Number: 6,003,796
[45] Date of Patent: Dec. 21, 1999

[54] SELF-LUBRICATING VERTICAL SHAFT IMPACT CRUSHER

[75] Inventor: Laddie L. James, Opelousas, La.

[73] Assignee: James Corporation of Opelousas, Inc., Opelousas, La.

[21] Appl. No.: 09/026,966

[22] Filed: Feb. 20, 1998

[51] Int. Cl.[6] ............................................. B02C 13/09
[52] U.S. Cl. .......................... 241/27; 241/30; 241/275; 241/301
[58] Field of Search .................. 241/15, 27, 29, 241/30, 275, 301

[56] References Cited

U.S. PATENT DOCUMENTS

| | | | |
|---|---|---|---|
| Re. 29,798 | 10/1978 | Johnson | 241/275 |
| 204,542 | 6/1878 | Daniels. | |
| 249,910 | 11/1881 | Dorrity. | |
| 255,964 | 4/1882 | Fitzgerald. | |
| 747,875 | 12/1903 | Fishbough. | |
| 1,405,151 | 1/1922 | Overstrom. | |
| 1,479,304 | 1/1924 | Krogh. | |
| 1,652,642 | 12/1927 | Shaw. | |
| 2,402,170 | 6/1946 | Lund | 241/66 |
| 2,950,943 | 8/1960 | Forrest | 308/187 |
| 2,955,768 | 10/1960 | Engi | 241/66 |
| 4,383,650 | 5/1983 | Contal et al. | 241/66 |
| 4,397,426 | 8/1983 | Warren et al. | 241/275 |
| 4,466,508 | 8/1984 | Buse | 184/13.1 |
| 4,560,113 | 12/1985 | Szalanski | 241/275 |
| 4,575,013 | 3/1986 | Bartley | 241/275 |
| 4,575,014 | 3/1986 | Szalanski et al. | 241/275 |
| 4,659,026 | 4/1987 | Krause et al. | 241/275 |
| 4,756,484 | 7/1988 | Bechler et al. | 241/275 |
| 5,131,601 | 7/1992 | Okawa | 241/275 |
| 5,323,974 | 6/1994 | Watajima | 241/275 |
| 5,533,685 | 7/1996 | Heck | 241/275 |

*Primary Examiner*—John M. Husar
*Attorney, Agent, or Firm*—Roy, Kiesel & Tucker

[57] ABSTRACT

A self-lubricating vertical shaft impact crusher having a housing, lubricating assembly, and a motor wherein the lubricant cools and lubricates the bearings of the rotating shaft and is circulated by using the hydraulic pressure associated with the height of the lubricant reservoir and propellers located on the vertical shaft itself within the shaft housing wherein the propellers provide additional driving force for the lubricant as the vertical shaft rotates.

43 Claims, 4 Drawing Sheets

SELF-LUBRICATING VERTICAL SHAFT IMPACT CRUSHER

BACKGROUND OF THE INVENTION

1. Field of the Invention

The present invention relates to a vertical shaft impact crusher for crushing ores and minerals, more specifically a vertical shaft impact crusher that is self-lubricating without the need of pumps for cooling and lubrication.

2. Prior Art

Vertical shaft impact crushers are well known in the art as a useful and effective means to crush ores and minerals for various uses including aggregate for concrete, paving stones, as well as many other uses.

A problem associated with the continuous use of vertical shaft impact crushers is the need to keep the rotating shaft bearings lubricated while at the same time preventing excessive heat buildup within the crusher and/or shaft housing. Various attempts have been made to remedy these concerns. Most crushers use conventional oil-lubrication systems which use filters to remove dirt and a pump to circulate the oil. These systems are subject to bearing failure in the event the pump malfunctions. Other lubricating systems have been disclosed in U.S. Pat. No. 4,560,113 to Szalanski (use of a grease injection system to lubricate the bearings) and U.S. Pat. No. 1,405,151 to Overstrom (using an axial bore inside the vertical shaft to lubricate the bearings). However, no reference discloses the use of at least one propeller on the outer surface of the shaft inside the shaft housing to provide a driving force for circulation of the lubricant as the shaft rotates. No reference discloses positioning the lubricant reservoir such that the hydraulic pressure associated with the height of the lubricant in the reservoir can be used to aid in the circulation and thermal cooling of the lubricant. Furthermore, no reference discloses using the combination of propellers on the shaft and hydraulic pressure of the lubricant itself to aid in the cooling and circulation of the lubricant.

In offshore platform drilling operations, a by-product of drilling operations is drill cuttings, which are the rock, mineral and other subterranean materials that are cut away by the drill from the well bore as the well is drilled. These materials are brought to the surface in the drilling fluid and drilling mud. A common problem that drilling companies face is the disposal of these materials because many of the drill cuttings produced from the drilling operations are deemed hazardous wastes by the United States Environmental Protection Agency ("USEPA") and various state environmental agencies. Disposal of these materials can be expensive, especially for offshore platform drilling operations where the material must be transported back to shore for proper disposal. Recent USEPA regulations have been passed which allow the drill cuttings to be placed back down hole if certain particle size requirements are met.

While the recent USEPA regulations allow the drill cuttings to be placed back downhole, there exists a need for an apparatus or method which will crush the drill cuttings on site and allow disposal of the crushed cuttings downhole, thereby allowing drilling companies to comply with the USEPA regulations without transporting the drill cuttings elsewhere for processing and/or disposal. The need is greater for offshore drilling platforms because it is very expensive to transport the drill cutting onshore to be crushed and shipped back to the offshore platforms for disposal in accordance with the new USEPA regulations.

A major concern for offshore drilling platforms is the amount of weight which can be placed on the platform itself. While conventional crushers are often bulky and heavy, the present invention is designed to fit on an offshore drilling platform while taking up a minimum amount of space and adding little weight to the offshore platform. As stated earlier, many of the conventional vertical shaft impact crushers use a pump to circulate the lubricant. While it may be conventional to use a pump for lubricant circulation, the use of a pump in a vertical shaft impact crusher on an offshore drilling platform presents several problems. First, during continuous drilling operations, the malfunction of the pump in the vertical shaft impact crusher will prevent the continuous disposal of the drill cuttings, thereby causing expense and delay. Second, in the event of a pump malfunction, a back-up pump must be available on the offshore platform at all times. The addition of two pumps, when not otherwise needed, adds additional weight on the offshore drilling platform. The present invention eliminates the lubricant pump, thereby eliminating all the concerns that offshore drilling platform operators would face should they choose to crush and dispose of the drill cuttings at the offshore drilling platform itself.

OBJECTS OF THE INVENTION

With these concerns in mind it is therefore an object of this invention to provide a selflubricating vertical shaft impact crusher.

It is a further object of this invention to provide a vertical shaft impact crusher that does not require a lubricating pump.

It is a further object of this invention to provide a vertical shaft impact crusher for offshore drilling operations.

It is a further object of this invention to provide a vertical shaft impact crusher that eliminates the concerns of pump maintenance.

It is a further object of this invention to provide a method for crushing drill cuttings.

It is a further object of this invention to provide an apparatus for use in a method for crushing drill cuttings.

It is a further object to provide a method for safe and efficient disposal of crushed drill cuttings.

It is a further object of this invention to provide an apparatus for use in a method of safe and efficient disposal of drill cuttings.

These and other advantages and objects of this invention shall become apparent from the ensuing description of the invention.

SUMMARY OF THE INVENTION

Accordingly, a self-lubricating vertical impact crusher is provided including a crusher housing having sidewalls; a shaft housing mounted within the crusher housing; a feeder connectable with the crusher housing; an anvil ring mounted within the crusher housing; a vertical shaft having at least one propeller attached thereto on a portion of the vertical shaft located within the shaft housing, the vertical shaft having an upper and lower end, the vertical shaft mounted within the shaft housing for rotation about a central axis, the vertical shaft having an table attached to the upper end, the table having at least one impeller attached to the surface of the table facing the feeder; a motor adapted to rotate the vertical shaft; and a lubricating assembly comprising a reservoir containing a lubricant, a first line connecting the reservoir with the shaft housing, and a second line connecting the shaft housing with the reservoir to permit circulation of the lubricant between the reservoir and the shaft housing when the vertical shaft is rotated.

Additionally, a method for crushing drill cuttings is provided which includes feeding the drilling cuttings into the feeder of a self-lubricating vertical impact crusher comprising a crusher housing having sidewalls; a shaft housing mounted within the crusher housing; the feeder connected to the crusher housing; an anvil ring mounted within the crusher housing; a vertical shaft having at least one propeller attached thereto on a portion of the vertical shaft located within the shaft housing, the vertical shaft having an upper and lower end, the vertical shaft mounted within the shaft housing for rotation about a central axis, the vertical shaft having an table attached to the upper end, the table having at least one impeller attached to the surface of the table facing the feeder; a motor adapted to rotate the vertical shaft; and a lubricating assembly comprising a reservoir containing a lubricant, a first line connecting the reservoir with the shaft housing, and a second line connecting the shaft housing with the reservoir to permit circulation of the lubricant between the reservoir and the shaft housing when the vertical shaft is rotated; and, rotating the vertical shaft to cause the drill cuttings to be crushed in the crusher housing until the average particle size of the drilling cuttings is smaller than a predetermined particle size. In a preferred embodiment, the method further comprises the steps of recycling the drilling cuttings which are larger than the predetermined particle size back into the crusher and adjusting the number and/or pitch of the propellers mounted on the vertical shaft.

DETAILED DESCRIPTION OF THE PREFERRED EMBODIMENTS OF THE INVENTION

Figure 1:
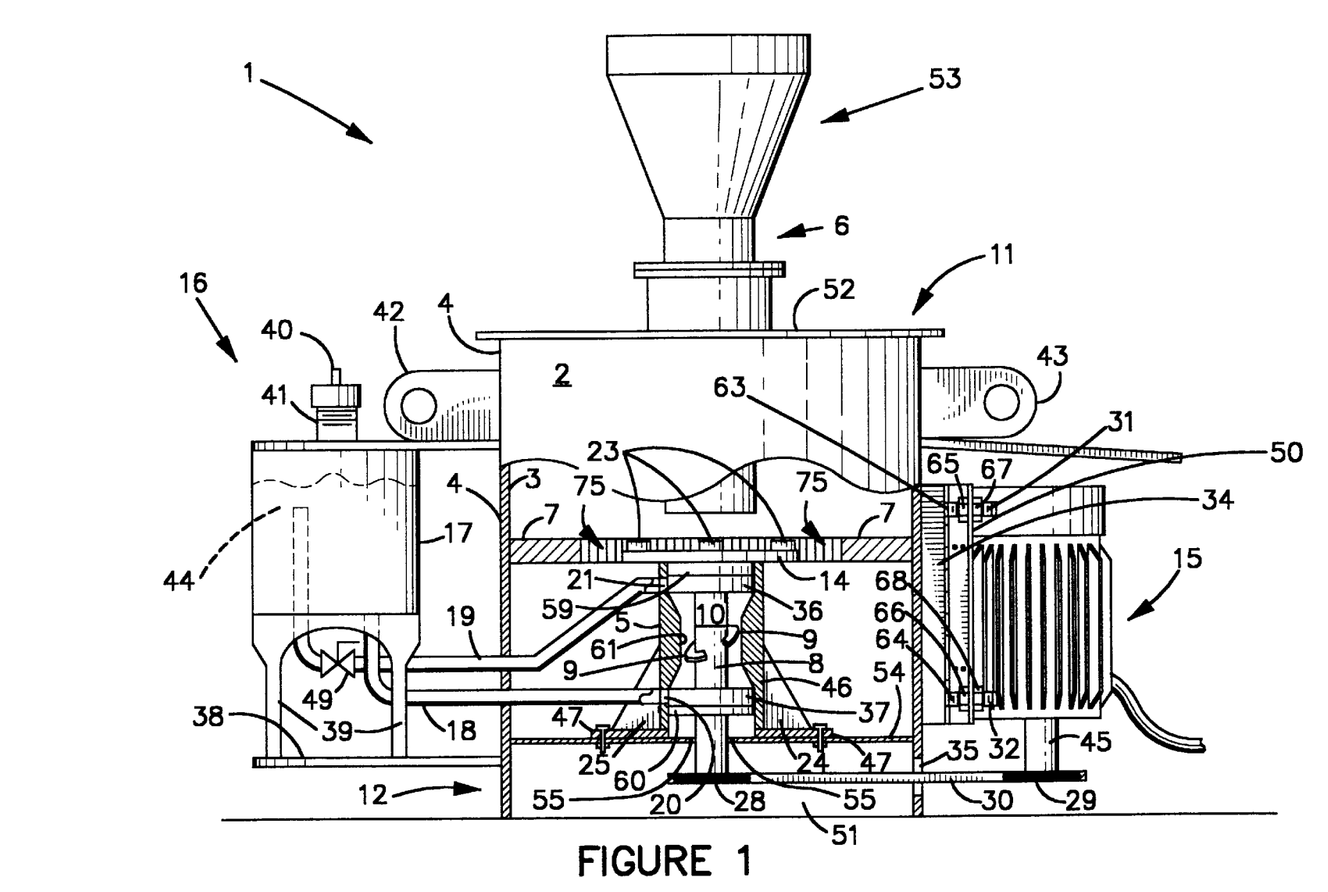
FIG. 1 is a view of the self-lubricating vertical shaft impact crusher, with a view of a cross section of the crusher housing.
Figure 2:
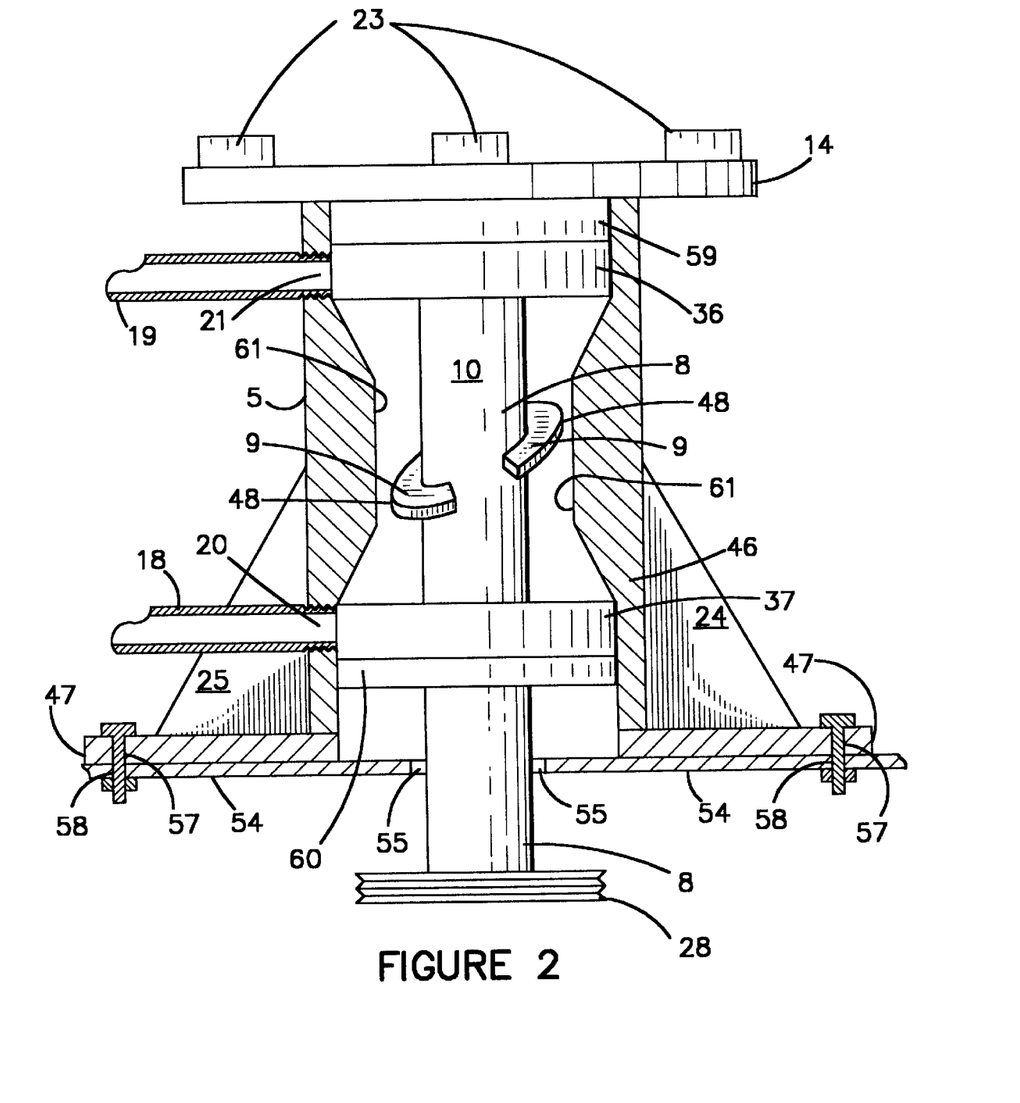
FIG. 2 is a cross sectional view of the shaft housing.

As shown in FIGS. 1 and 2 the self-lubricating vertical shaft impact crusher 1 comprises a crusher housing 2, a lubricating assembly 16, and a motor 15. Crusher housing 2 is a hollow tubular member having sidewalls with an inner side 3 and an outer side 4 and open ends. A feeder 6 is connected to the upper end 11 of crusher housing 2, and in the preferred embodiment feeder 6 comprises a planar cover 52 connectable to crusher housing 2 and having a hole therein where a funnel member 53 passes through to allow material to flow into crusher 1. In the preferred embodiment, crusher housing 2 is a hollow cylindrical member. Attached to the outside of crusher housing 2 are lifting eyes 42, 43 which provide a grabbing means when crusher 1 is to be moved from one location to another.

Located on one side of crusher housing 2 is lubricating assembly 16. Lubricating assembly comprises a reservoir 17 having a fill pipe 41 with a cap 40 to add lubricant 44. Extending from reservoir 17 to crusher housing 2 are inlet line 18 and outlet line 19. In the preferred embodiment lubricating assembly 16 sits upon reservoir plate 38 which is connected to crusher housing 2. The height of reservoir 17 can be adjusted using legs 39 of different heights or adjusting the height of reservoir plate 38.

Also connected to crusher housing 2 is motor 15 which has a motor shaft 45 with a motor pulley 29 on the end of motor shaft 45. Crusher housing 2 has a belt opening 35 which allows drive belt 30 to extend from and around motor pulley 29 to and around shaft pulley 28, thereby allowing rotational communication between motor 15 and vertical shaft 8. Tension in drive belt 30 is adjusted by adjusting the distance between motor 15 and crusher housing 2.

Feeder 6 is attached to the upper end 11 of crusher 1 which enables gravity to help in the feeding of material to crusher 1. Below feeder 6 is table 14. Adjacent to inner wall 3 of crusher housing 2 is anvil ring 7. Anvil ring 7 is placed inside crusher housing 2 at substantially the same height as table 14 so that during operation, material fed to the crusher 1 is thrown against the anvil ring 7. A space is left between anvil ring 7 and the edges of table 14 for material to fall through an open ended exit 51 at the bottom of crusher 1. Because of its weight, anvil ring 7 can simply rest upon mounts (not shown) attached on the inner wall 3 of crusher housing 2 or it can be attached to inner wall 3 by other means such as tack welding or bolting. Simply resting anvil ring 7 upon the mounts or bolting anvil ring 7 to inner wall 3 is preferred because it allows for easy maintenance and exchange of anvil rings.

Figure 5:
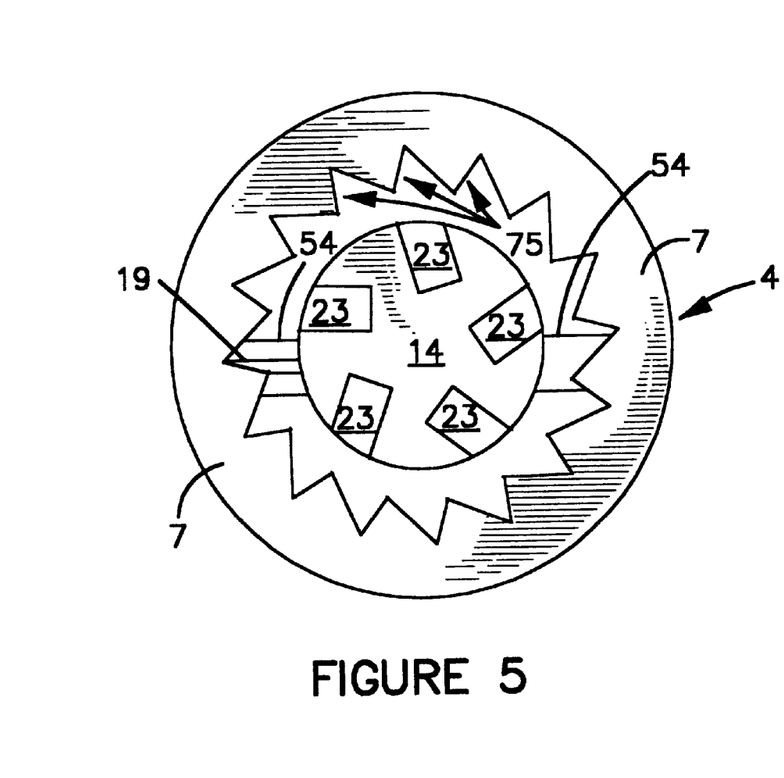
FIG. 5 is a top view of the table and anvil ring with the cover of the crusher removed.

Anvil ring 7 can be any type of anvil ring or other means known in the art for use in crushing devices. Preferably, as shown in FIG. 5, anvil ring 7 is ringed member with a series of planar surfaces 75 positioned along the perimeter of its inner edge facing the interior of crusher 1 and impellers 23. However, planar surface 75 need not be incorporated into the ring 7 itself. Anvil ring 7 could also be constructed in other ways, including, but not limited to, those as shown (and incorporated by reference) in U.S. Pat. No. 4,756,484 to Bechler et al. Impellers 23 are located on the surface of table 14 which faces feeder 6. In the preferred embodiment five (5) impellers are placed atop table 14 equidistant from the center point and equidistant around the perimeter of table 14. The planar surfaces 75 are preferably aligned so that a substantial amount of the material thrown from the impellers 23 during operation of crusher I contacts surfaces 75 at a right angle.

As shown in FIG. 1, shaft housing 5 comprises tubular member 46, having open ends and sidewalls, perpendicularly attached to a horizontal shaft plate 47. Vertical shaft 8 sits within and extends through both hollow tubular member 46 and shaft plate 47. Vertical support is provided to tubular member 46 by way of gussets 24, 25 which are mounted to the outer wall of tubular member 46 and to upper side of shaft plate 47. Shaft bearings 36, 37 are mounted within tubular member 46 and hold vertical shaft 8 in place and prevent vertical movement of vertical shaft 8 within shaft housing 5. Attached to the bottom of vertical shaft 8 is shaft pulley 28. Shaft housing 5 has an inlet 20 and an outlet 21 which are located adjacent to bearings 36, 37. In the preferred embodiment outlet 21 is located near the upper bearing 36 while inlet 20 is located near the lower bearing 37. Seals 59, 60 are provided at both the upper and lower ends of shaft housing 5 to prevent leakage of lubricant 44 from the shaft housing 5.

As shown in FIG. 2, in the preferred embodiment, shaft housing 5 is mounted onto a single cross bar 54. Cross bar 54 is a planar member having a central bore 55 through which vertical shaft 8 extend shaft plate 47 has four bolt apertures 57 in addition to shaft bore 56. Cross bar 54 also has bolt apertures 58 that correspond and align with the bolt apertures 57 in shaft plate 47. Shaft plate 47 is bolted onto cross bar 54 and secured into place. Cross bar 54 is positioned within crusher housing 2 such that cross bar 54 also acts as a cover to prevent crushed material from falling onto and hindering operation of drive belt 30. Cross bar 54 may be constructed to be slightly rounded or inclined on the upper surfaces not contacted by shaft plate 47 to prevent accumulation of crushed material on the upper side of cross bar 54.

Figure 3A:
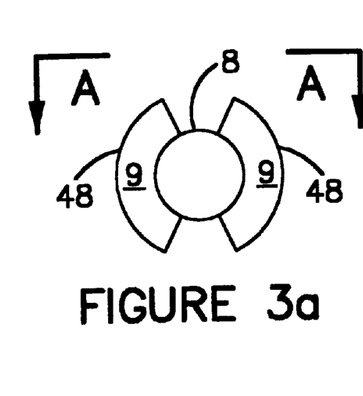
FIG. 3a is a top view of the propeller alignment on the vertical shaft.
Figure 3B:
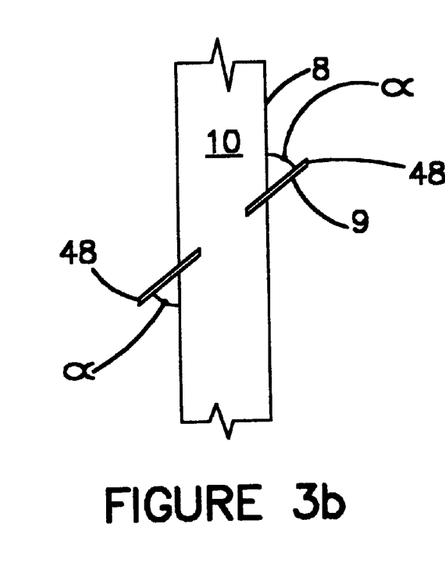
FIG. 3b is a side view of the propeller alignment on the vertical shaft.

As shown in FIG. 3b, attached to the outer surface 10 of vertical shaft 8 is one or more propellers 9. Tubular member 46 is constructed such that between inner wall 61 and outer edges 48 of propeller(s) 9, an annulus is formed. Depending on the application, the distance between outer edges 48 and inner wall 61 should range between 1/32 (0.03125) and 1/2 (0.50000) inches.

Propeller 9 can exist in one or more embodiments. First propeller 9 can be any device connectable to vertical shaft 8 or the outer surface 10 thereof which provides a driving force to lubricant 44 to propel it through shaft housing 5 and back into the reservoir 17. Propeller 9 can be a single generally planar member connected to vertical shaft 8, to its outside surface 10, located within shaft housing 5. In this embodiment the single planar propeller 9 coils around vertical shaft 8 at a predetermined pitch and is attached to vertical shaft 8 along an inner edge of the generally planar propeller.

As used herein, the pitch of the propeller 9 shall be the angle between the surface of vertical shaft 8 and the planar surface of propeller 9 at any given point along the perimeter of vertical shaft 8. In FIG. 3b, the pitch of the propeller(s) 9 is denoted by angle marked $\alpha$. The propeller(s) 9 can be pitched at any angle between 1° and 179° depending on a user's specifications and desired direction of lubricant flow. The pitch is generally constant, though need not be so. For purpose of the description, assuming a clockwise rotation of vertical shaft 8 when viewed from above, down its central axis, if downward lubricant flow through shaft housing 5 is desired, the pitch angle, $\alpha$, would range between about 1° and 89°, while for upward lubricant flow through shaft housing 5, the pitch angle, $\alpha$, would range between about 91° and 179°.

The direction of fluid flow can also be reversed using the same pitch angle $\alpha$ by simply reversing the rotational direction of vertical shaft 8. In that embodiment, lubricant 44 would enter shaft housing 5 through outlet 21 and exit through inlet 20 flow in the opposite directions through inlet line 19 and outlet line 18.

As shown in FIGS. 3a and 3b, in the preferred embodiment, there are two propellers 9 which are constructed from stainless steel, although other materials of sufficient strength and corrosion resistance are acceptable. The propellers 9 are attached to vertical shaft 8, along the inner edge of the propeller 9, midway between the shaft bearings 36, 37. Preferably, the inner edge of propeller 9 attaches to the outer surface 10 of vertical shaft 8. Preferably, propellers 9 have a pitch angle ranging between 120° and 150° for the preferred shaft rotational speed of between 1000 and 8000 rpm and upward lubricant flow. Propellers 9 are planar, semi-circular members which have an outer arc length approximately equal to one-half (½) to one-third (⅓) the perimeter or circumference of vertical shaft 8. Propellers 9 are attached to vertical shaft 8 by welding them to vertical shaft 8. Propellers 9 can also be constructed to be attached to vertical shaft 8 by other means such as bolting them onto vertical shaft 8.

Referring back to FIGS. 1 and 2, vertical shaft 8 extends completely through shaft housing 5 and has shaft pulley 28 attached to the lower end of vertical shaft 8. Shaft pulley 28 and motor pulley 29 are aligned such that drive belt 30 can be connected to both, via belt opening 35 in crusher housing 2, allowing rotational communication between motor 15 and vertical shaft 8. Shaft pulley 28 is an interchangeable pulley so that it can be changed to vary the rotational speed of vertical shaft 8 without having to change motor 15.

In the preferred embodiment, reservoir 17 has legs 39 which sit upon reservoir plate 38 attached to crusher housing 2. Reservoir 17 is a hollow container having a fill pipe 41 located at the upper end of reservoir 17 to allow reservoir 17 to be filled with lubricant 44. In the preferred embodiment, reservoir 17 has a capacity of five (5) gallons, but the size and capacity of reservoir 17 depends on the desired application and size of crusher 1. Fill pipe 41 is adapted to receive a cap 40 which prevents lubricant 44 from leaking out of fill pipe 41. Inlet line 18 is connected to reservoir 17 and extends from reservoir 17 to inlet 20 on shaft housing 5. Outlet line 19 is connected to outlet 21 on shaft housing 5 and extends to reservoir 17. In the preferred embodiment, outlet line 19 extends upward into reservoir 17 and below the lubricant level therein. A valve 49 may be inserted into either or both inlet line 18 and outlet line 19 between shaft housing 5 and reservoir 17.

Attached to motor 15, via motor shaft 45 is motor pulley 29. As stated earlier, motor pulley 29 is aligned to allow rotational communication between motor 15 and vertical shaft 8 via drive belt 30. Motor 15 can be any motor capable of producing the revolutions per minute (rpm) required for a particular application. Motor 15 can be powered in any manner known in the art for powering motors. Preferably, an electric motor will be used.

Motor 15 can be fixedly attached to crusher housing 2. However, applicants have found that an adjustable motor mounting 62 is desirable to allow for easy maintenance and operation of crusher 1. An adjustable motor mounting 62 is desirable because it allows the easy maintenance of the motor 15 and motor pulley 29 as well as easy access to permit drive belt 30 to be changed with little or no problem.

Figure 4:
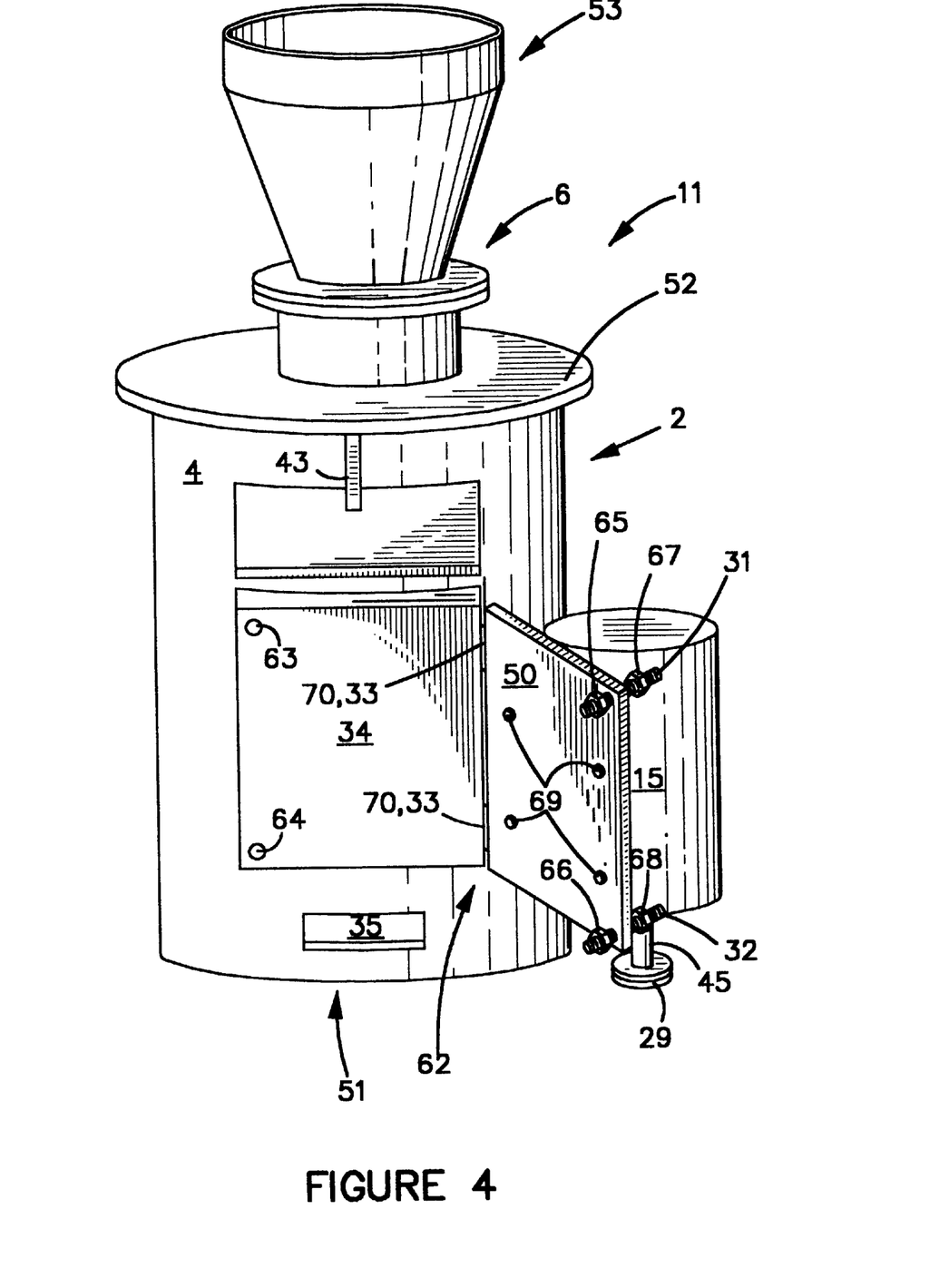
FIG. 4 is a view of the motor adjusting means.

In the preferred embodiment adjustable motor mounting 62 is constructed as follows. As shown in FIG. 4, a plate 34 is connected to crusher housing 2 by any means well known in the art including, but not limited to, bolting and tack welding. Connected to one side of plate 34 is adjusting mount 70, in this case hinge 33. The opposite end of hinge 33 is connected to plate 50 such that plate 50 can move toward and away from plate 34. Motor 15 is connected to plate 34 by bolts 69 or any other means for connecting well known in the art, including tack welding. Tension in drive belt 30 is adjusted after drive belt 30 has been placed around both motor pulley 29 and shaft pulley 28. Plate 50, together with motor 15, is then moved away from crusher housing 2 via hinge 33 until the desired tension is achieved. Then, adjustable bolts 31, 32 are affixed within holes 63, 64 and inner nuts 65, 66 are adjusted until the desired distance between motor 15 and crusher housing 2 is achieved. Then, outer nuts 67, 68 are adjusted to hold plate 50 and motor 15 in place at the desired distance between motor 15 and crusher 1, thereby keeping the desired tension in drive belt 30. Hence, in the preferred embodiment, the adjustable motor mounting 62 is a combination of hinge 33, holes 63, 64 in plate 34, bolts 31, 32, inner nuts 65, 66 and outer nuts 67, 68.

In another embodiment, plate 50 could connect directly with crusher housing 2. In an additional embodiment, motor 15 could be placed directly below vertical shaft 8 such that motor shaft 45 connects directly to vertical shaft 8. This embodiment works best when no variation in the required rpms of the vertical shaft is required. In other embodiments, adjusting mount 70 can be other devices well known in the art which allow the distance between motor 15 and crusher housing 2 to vary.

During operation, rocks, mineral or other material ("material") that is to be crushed enters the crusher I via feeder 6. Motor 15 is switched on thereby causing rotation of vertical shaft 8 and table 14. As material falls onto table 14, the centrifugal force of the rotating table 14 causes the material to move towards impellers 23. Because of the high rotational speeds and centrifugal forces, the material is thrown from impellers 23 at high velocities toward anvil ring 7 where the material is crushed upon impact with the surfaces 75 of anvil ring 7. The now crushed material falls through the space between anvil ring 7 and table 14 to the lower end of crusher 1 where it exits crusher 1 via exit 51 which is preferably an open bottom in crusher 1. The crushed material which exits crusher 1 is then collected in accordance with the user's specifications.

During the crushing operations a high amount of heat is generated in the shaft bearings 36, 37 due to the frictional forces created by the rotation of vertical shaft 8. To keep the system cool while at the same time avoiding the use of a lubricant pump, propeller(s) 9 have been placed on vertical shaft 8 and reservoir 17 has been placed at a predetermined height so that the level of lubricant 44 in reservoir 17 is a predetermined height above either inlet 20 or outlet 21 thereby creating an additional driving force for lubricant 44 in the form of hydraulic pressure.

During operation, lubricant 44 flows from reservoir 17 into inlet line 18 and through inlet 20 in shaft housing 5 where it lubricates and cools shaft bearing 37. As vertical shaft 8 is rotating, the rotation causes propeller(s) 9 to provide a driving force to move lubricant 44 in an upward direction toward shaft bearing 36 where lubricant 44 cools and lubricates shaft bearing 36. Lubricant 44 then flows through outlet 21 and into outlet line 19. The now heated lubricant 44 rises through outlet line 19 into reservoir 17. As lubricant 44 rises into reservoir 17 through outlet line 19 it is cooled and mixed with the cooler lubricant contained within reservoir 17. The combination of the hydraulic pressure created by the lubricant level in reservoir 17 together with the propeller(s) 9 on vertical shaft 8 provides an effective means of cooling the shaft bearings 36, 37. As discussed earlier, the pitch of the propeller(s) 9 will determine the direction of lubricant flow through shaft housing 5, but in the preferred embodiment, lubricant 44 will flow in an upward direction through shaft housing 5. The combination of the pitch of the propeller(s) 9 and the speed of vertical shaft 8 will determine the flow rate of lubricant 44.

In larger scaled units, it may be desirable to add devices to dissipate additional heat. This may be accomplished by placing cooling fins or any other additional cooling means within reservoir 17 and/or attached to the outside surfaces of reservoir 17.

Also disclosed is a method of using crusher 1 to dispose of drill cuttings which are defined as the subterranean material that is encountered during drilling operations and includes, but is not limited to, shale, gravel, stone, salacious material and other material from substrata formations encountered during drilling operations.

In a method of crushing drill cuttings, a crusher 1 is taken to a drilling site and operated. As drilling operations are on-going, crusher 1 is operated by turning motor 15 on and thereby rotating vertical shaft 8 while drill cuttings are fed to the crusher 1 where the drill cuttings are crushed. A screen and shaker can be placed below exit 51 to allow particles of a predetermined size to pass through the screen while particles which are too large can be shaken off the screen and recycled back to crusher I for further crushing. In two of the preferred methods, the drill cuttings will be crushed to an average particle size below 60 mesh sieve and below 200 mesh sieve, respectively.

The method can also include adjusting several other features of the crusher 1. The pitch of the propeller(s) 9 can be varied. The number of propeller(s) 9 attached to the outside surface 10 of vertical shaft 8 can also be varied. Additionally, both the number and the pitch of the propeller (s) 9 can be varied at the same time. The preferred pitch ranges are between about 1° and 179°, preferably between about 120° and 150°. Propellers 9 can constructed as previously described herein.

In a method which also incorporates the disposal of the crushed drill cuttings, the crushed particles below the predetermined particle size which pass through the mesh screen will be small enough to place back downhole. Disposal occurs back downhole by methods currently in use and known in the art for downhole disposal of materials.

During crushing operations, it may be desirable to vary the rotational speed of the vertical shaft. Preferably, during operation and use of the method disclosed herein the crusher I will be operated preferably between about 1000 and 8000 rpm. Due to its interchangeable nature, the size of shaft pulley 28 can be varied in relation to the size of motor pulley 29 to produce the desired speed of the vertical shaft. With circular pulleys, the relation of the speed of the pulleys is directly proportional to the diameters of the pulleys.

Although the preferred embodiment has been described, it will be appreciated by those skilled in the art to which the present invention pertains that modifications, changes, and improvements may be made without departing from the spirit of the invention defined by the claims.

I claim:

1. A self-lubricating vertical impact crusher comprising:
    a crusher housing;
    a shaft housing;
    a feeder adapted to feed material that will be crushed to said crusher housing;
    an anvil ring mounted within said crusher housing;
    a vertical shaft having at least one propeller attached thereto on a portion of said vertical shaft located within said shaft housing, said vertical shaft having an upper and lower end, said vertical shaft mounted within said shaft housing for rotation about a central axis, said vertical shaft having a table attached to said upper end, said table having at least one impeller attached to said table;
    a motor adapted to rotate said vertical shaft; and
    a lubricating assembly comprising a reservoir containing a lubricant, a first line fluidly connecting said reservoir with said shaft housing, and a second line fluidly connecting said shaft housing with said reservoir;
    whereby rotation of said shaft and said at least one propeller on said shaft propels said lubricant between said shaft housing and said reservoir.

2. The apparatus according to claim 1 wherein said lubricant has a predetermined level within said reservoir, said level being a predetermined distance higher that at least one of the inlets between said first line or said second line and said shaft housing.

3. The apparatus according to claim 1 further comprising an adjustable motor mount.

4. The apparatus according to claim 3 wherein said adjustable motor mount comprises:
 a. a base connectable with said crusher housing;
 b. a plate connectable with said base, said plate capable of having said motor mounted thereon; and,
 c. an adjusting mount connectable with said base and said plate, said adjusting mount allowing the distance between said motor and said crusher housing to be varied.

5. The apparatus according to claim 1 wherein each said propeller is a semi-circular planar member having a predetermined outer arc length, said outer arc length of said propeller ranging between one-half (½) and one-third (⅓) of the perimeter of said vertical shaft.

6. The apparatus according to claim 1 wherein each said propeller has a predetermined pitch.

7. The apparatus according to claim 6 wherein said pitch of each said propeller ranges between about 1° and 89°.

8. The apparatus according to claim 6 wherein said pitch of each said propeller ranges between about 91° and 179°.

9. The apparatus according to claim 6 wherein said pitch of each said propeller ranges between 120° and 150°.

10. The apparatus according to claim 1 wherein said propeller is continuous planar member having an inner edge, said planar member attached to said vertical shaft along said inner edge, said planar member coiling around a portion of said vertical shaft located within said shaft housing at a predetermined pitch.

11. The apparatus according to claim 10 wherein said pitch of said propeller ranges between about 1° and 89°.

12. The apparatus according to claim 10 wherein said pitch of said propeller ranges between about 91° and 179°.

13. The apparatus according to claim 12 wherein said pitch of said propeller ranges between 120° and 150°.

14. The apparatus according to claim 1 wherein said reservoir has sidewalls, said reservoir sidewalls having cooling fins attached thereto.

15. The apparatus according to claim 1 wherein said crusher housing has at least one sidewall.

16. The apparatus according to claim 15 wherein said shaft housing is mounted within said crusher housing.

17. The apparatus according to claim 1 wherein said feeder is connectable with said crusher housing.

18. The apparatus according to claim 1 wherein said table has at least one impeller attached to a surface of said table facing said feeder.

19. A method for crushing drill cuttings comprising the steps of:
 a. feeding said drilling cuttings into a feeder of a self-lubricating vertical impact crusher comprising a crusher housing; a shaft housing; said feeder adapted to feed material that will be crushed to said crusher housing; an anvil ring mounted within said crusher housing; a vertical shaft having at least one propeller attached thereto on a portion of said vertical shaft located within said shaft housing, said vertical shaft having an upper and lower end, said vertical shaft mounted within said shaft housing for rotation about a central axis, said vertical shaft having a table attached to said upper end, said table having at least one impeller attached to said table; a motor adapted to rotate said vertical shaft; and a lubricating assembly comprising a reservoir containing a lubricant, a first line fluidly connecting said reservoir with said shaft housing, and a second line fluidly connecting said shaft housing with said reservoir, whereby rotation of said shaft and said at least one propeller on said shaft propels said lubricant between said shaft housing and said reservoir; and,
 b. rotating said vertical shaft to cause said drill cuttings to be crushed in said crusher housing until the average particle size of the crushed drilling cuttings is smaller than a predetermined particle size.

20. The method according to claim 19 wherein said crusher further comprises an adjustable motor mount.

21. The method according to claim 20 wherein said adjustable motor mount comprises a base connectable with said crusher housing; a plate connectable with said base, said plate capable of having a motor connected thereto; and, an adjusting mount connectable with said base and said plate, said adjusting mount allowing the distance between said motor and said crusher housing to be varied.

22. The method according to claim 19 wherein said lubricant has a predetermined level within said reservoir, said level being a predetermined distance higher than at least one of the inlets between said first line or said second line and said shaft housing.

23. The method according to claim 19 further comprising the step of adjusting the number of propellers.

24. The method according to claim 19 wherein said motor is operated to rotate said vertical shaft between about 1000 and 8000 revolutions per minute.

25. The method according to claim 19 wherein said predetermined particle size of said crushed drill cuttings is approximately 200 mesh sieve.

26. The method according to claim 19 further comprising the step of recycling said crushed drill cuttings which have exited said crusher, but which have a particle size greater than said predetermined particle size.

27. The method according to claim 19 further comprising the step of disposing said drill cuttings having a particle size equal to or smaller than said predetermined particle size.

28. The method according to claim 19 wherein said wherein each said propeller is a semi-circular planar member having a predetermined outer arc length, said outer arc length of said propeller ranging between one-half (½) and one-third (⅓) of said perimeter of said vertical shaft.

29. The method according to claim 19 wherein each said propeller has a predetermined pitch.

30. The method according to claim 29 wherein said pitch of each said propeller ranges between about 1° and 89°.

31. The method according to claim 29 wherein said pitch of each said propeller ranges between about 91° and 179°.

32. The method according to claim 29 wherein said pitch of each said propeller ranges between 120° and 150°.

33. The method according to claim 19 wherein said propeller is continuous planar member having an inner edge, said planar member attached to said vertical shaft along said inner edge, said planar member coiling around the portion of said vertical shaft located within said shaft housing at a predetermined pitch.

34. The method according to claim 33 wherein said pitch of said propeller ranges between about 1° and 89°.

35. The method according to claim 33 wherein said pitch of said propeller ranges between about 91° and 179°.

36. The apparatus according to claim 35 wherein said pitch of said propeller ranges between 120° and 150°.

37. The method according to claim 19 further comprising the step of adjusting the pitch of said propellers to achieve a predetermined lubricant circulation rate.

38. The method according to claim 19 further comprising the step of adjusting the number of propellers and the pitch of said propellers to achieve a predetermined lubricant circulation rate.

39. The method according to claim 19 wherein said predetermined particle size of said crushed drill cuttings is approximately 60 mesh sieve.

40. The method according to claim 19 wherein said crusher housing has at least one sidewall.

41. The method according to claim 40 wherein said shaft housing is mounted within said crusher housing.

42. The method according to claim 19 wherein said feeder is connectable with said crusher housing.

43. The method according to claim 19 wherein said table has at least one impeller attached to a surface of said table facing said feeder.

* * * * *